United States Patent
Ely

[11] Patent Number: 6,116,306
[45] Date of Patent: Sep. 12, 2000

[54] METHOD AND APPARATUS FOR POSITIONING LOG BLOCKS ON OPTIMUM CENTER IN LATHE CHARGER FOR TRANSFER TO VENEER LATHE

[75] Inventor: Gary W. Ely, Canby, Oreg.

[73] Assignee: The Coe Manufacturing Company, Potrland, Oreg.

[21] Appl. No.: 09/160,531

[22] Filed: Sep. 24, 1998

[51] Int. Cl.⁷ .................................................. B23Q 15/00
[52] U.S. Cl. .................. 144/416; 82/124; 144/215.2; 144/357; 250/559.25; 356/384; 702/167
[58] Field of Search ................................ 144/215.2, 357, 144/288.5, 208.1, 382, 387, 391, 392, 394, 416, 386; 82/124, 170; 356/384, 385, 386, 387; 702/167, 169; 250/559.25

[56] References Cited

U.S. PATENT DOCUMENTS

| | | | |
|---|---|---|---|
| 3,806,253 | 4/1974 | Denton | 356/157 |
| 4,197,888 | 4/1980 | McGee et al. | 144/357 |
| 4,335,763 | 6/1982 | Mcgee | 144/357 |
| 4,384,601 | 5/1983 | Richert | 144/357 |
| 4,397,343 | 8/1983 | Fields | 144/357 |
| 4,398,580 | 8/1983 | Sohn et al. | 144/357 |
| 4,427,044 | 1/1984 | Plough et al. | 144/356 |
| 4,811,776 | 3/1989 | Bolton et al. | 144/357 |
| 4,884,605 | 12/1989 | Ely | 144/357 |
| 4,895,449 | 1/1990 | Marshall | 356/386 |
| 4,965,734 | 10/1990 | Edwards et al. | 364/474.09 |
| 5,052,455 | 10/1991 | Mason | 144/357 |
| 5,449,030 | 9/1995 | Mutsuura et al. | 144/357 |
| 5,518,052 | 5/1996 | Westberg et al. | 144/398 |
| 5,582,224 | 12/1996 | Mutsuura et al. | 144/215.2 |

*Primary Examiner*—W. Donald Bray
*Attorney, Agent, or Firm*—Klarquist Sparkman Campbell Leigh & Whinston LLP

[57] ABSTRACT

A method and apparatus for positioning a log in a lathe charger for transfer to a veneer lathe for peeling in which the geometrical centerline of the log is first determined by sensing the log in an at-rest position with light sensors or mechanical sensors and then two geocenters where such centerline intersects the ends of the log are determined. The log is then scanned with light scanners while it is rotated on charger spindles about such centerline to determine the optimum yield axis of the log by computer processing of the scan data. Two computed centers where the optimum yield axis intersects the opposite ends of the log are computed and the vectors of such computed centers relative to the geocenters are computed. A common line extending between the computed centers is determined and the displacement angle between such common line and a reference line is computed. The reference line may be a vertical axis or the charger pendulum arm radius. Then the log is rotated through the displacement angle to position the common line parallel to the reference line. Next the charger spindles are adjusted laterally along the reference line until the computed centers of the log are both positioned at the point of intersection of the common line and an arc line of travel of the pendulum arm. Then the pendulum arms clamp the log with chucks engaging the ends of the log and the log is transferred from the charger to the veneer lathe spindles by pivoting the pendulum arms to move their chucks and the log along the arc line to the lathe.

20 Claims, 8 Drawing Sheets

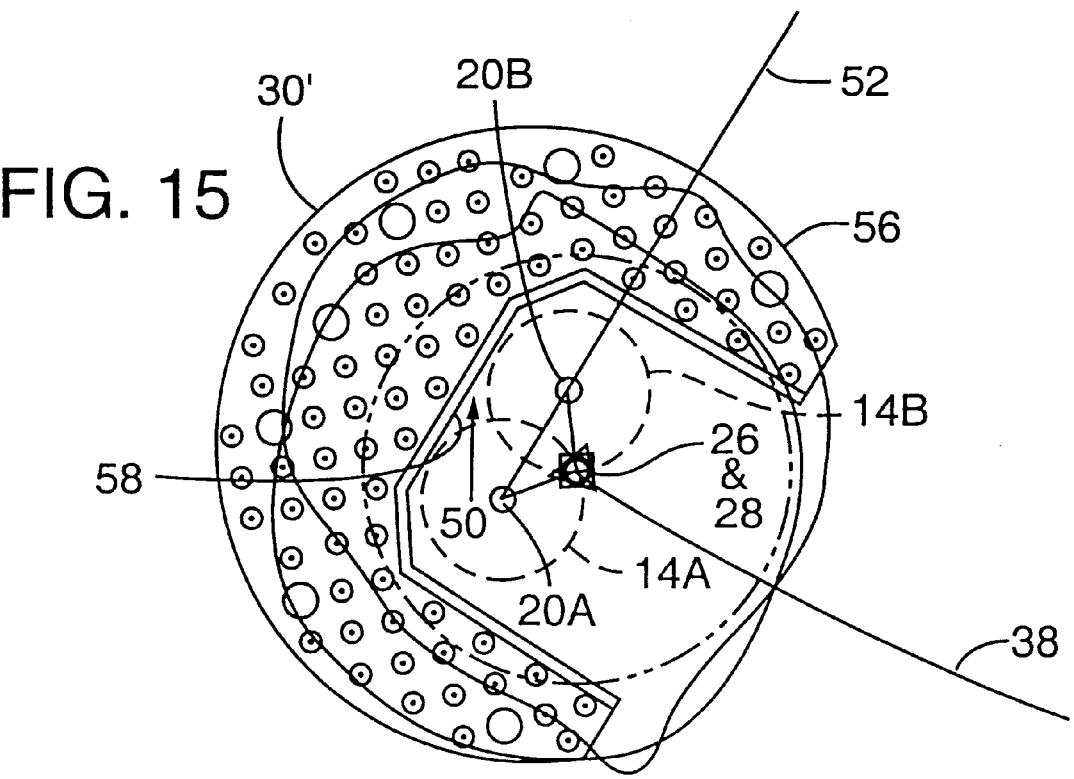
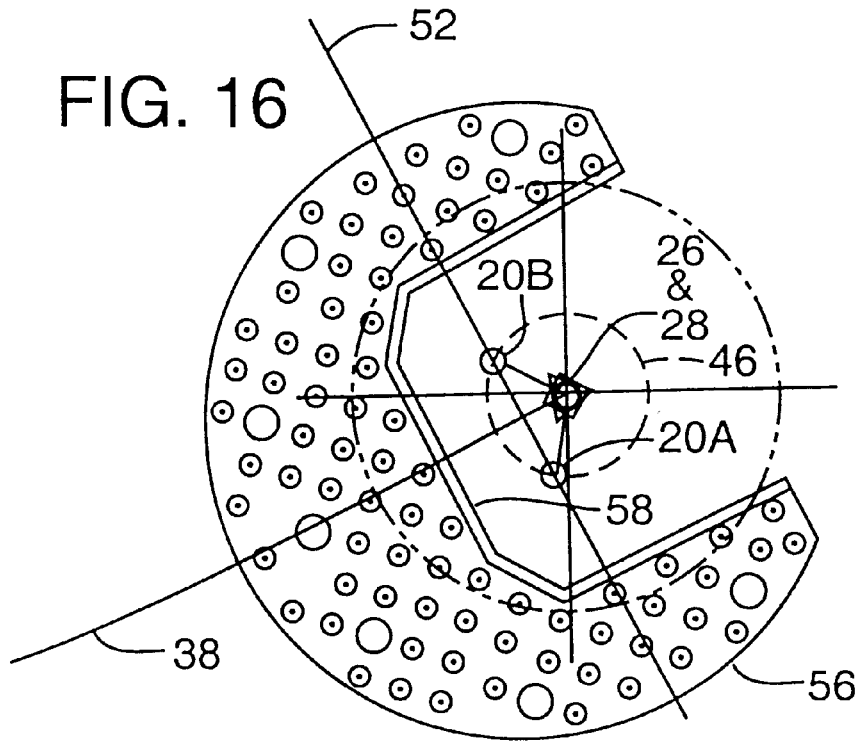

METHOD AND APPARATUS FOR POSITIONING LOG BLOCKS ON OPTIMUM CENTER IN LATHE CHARGER FOR TRANSFER TO VENEER LATHE

FIELD OF THE INVENTION

The present invention relates generally to a method and apparatus or positioning a log in a lathe charger, and in particular, to such a method and apparatus which scans the log to determine its optimum yield axis and adjusts the position of the log to align the optimum yield axis with the chucks of pendulum arms for transfer to a veneer lathe in order to peel a thin sheet of veneer from such log while rotating the log about such axis.

A preferred embodiment of the invention initially rough centers the log by a geometric centering apparatus which senses the log while it is at rest by mechanical sensors or by light sensors or both, which supply data signals to a computer system to determine its geometrical centerline and two geocenters where the geometrical centerline intersects the opposite ends of the log. Thereafter, two charger spindles engage the two geocenters at the opposite ends of the log and the log is rotated while it is scanned with light or other electromagnetic radiation at a plurality of positions spaced along the length of the log. A computer system processes the scan data produced by the scanners and computes the optimum yield axis of the log as well two computed centers at the opposite ends of the log where the optimum yield axis intersects the log. The computer also computes the vector distance and angle of such computed centers relative to the geometrical centerline and then determines a common line which extends between the two computed centers corresponding to the optimum yield axis. Next the computer determines a displacement angle between such common line and a reference line which may be a vertical axis or the radius of the pendulum arms. Then the log is rotated through the displacement angle until the common line is parallel to the reference line. Next, the lathe charger spindles are moved laterally by an adjustment mechanism along the reference line until the two computed centers coincide at the intersection of the common line and an arc path of travel of the pendulum arms. The pendulum arms are moved together until their chucks clamp the ends of the log and the pendulum arms are rotated about a pivot axis to move the log in the arc path from the charger spindles to the lathe spindles.

The method and apparatus of the present invention have the advantage that they enable the logs to be more accurately positioned adjacent the chucks of the pendulum arms for clamping the logs including small diameter logs, and transfer of the logs from the charger to the lathe without dropping the logs or causing interference between the pendulum chucks and the lathe spindles.

BACKGROUND OF THE INVENTION

It has previously been proposed in U.S. Pat. No. 4,335,763 of McGee et al., issued Jun. 22, 1982, to geometrically rough center the log and clamp the log in a geometrically centered position, to cause charger spindles to engage the ends of the log at the rough center position and to rotate the log about the charger spindles while scanning it with light beams to determine the optimum yield axis of the log. The charger spindles are then moved laterally to align the optimum yield axis of the log at a transfer position which is located at a predetermined position relative to the lathe axis. The log is then moved from the transfer position to the lathe axis by pivoting pendulum arms in engagement with a log.

A similar teaching is shown in U.S. Pat. No. 4,398,580 of Sohn et al., issued Aug. 16, 1983.

When scanning the log to determine the optimum yield axis, it is possible to use a break beam type light scanner in which the log is positioned between the light source and the light detector as shown in U.S. Pat. No. 4,335,763 of McGee and U.S. Pat. No. 4,965,734 of Edwards et al., issued Oct. 23, 1990. However, light reflection-type scanning is more accurate and has been used previously in a log charger centering apparatus while rotating the log on the charger spindles during scanning as shown in U.S. Pat. No. 4,884,605 of Ely, issued Dec. 5, 1989.

As shown in U.S. Pat. No. 4,811,776 of Bolton et al., issued Mar. 14, 1989, it is previously been proposed to provide a lathe charger apparatus and method for centering logs by employing two pairs of interconnected rotating disks connected to the ends of the log to provide a pair of double pivots at the opposite ends of the log. However, this is a more complicated log positioning apparatus and includes pendulum arms which are moved laterally along beams, rather than pivoted in order to transfer the log from the charger to the lathe. This prior apparatus of Bolton also employs a geometrical centering step for determining the geometric center axis of the log and then scans the log while rotating it about the charger spindles aligned with the geometric center axis in order to determine the optimum yield axis. The optimum yield axis is aligned with a replicate axis corresponding to the veneer lathe axis by rotating the two pairs of interconnected disks which provide a double axis rotation for adjustment of the spindles. However unlike the present invention, the method used in the Bolton patent does not measure the displacement angle between a common line intersecting two computed centers at the opposite ends of the log and a reference line and does not rotate the log block through the displacement angle to position the common line parallel to a reference line which may be either a vertical axis or the pendulum radius in the manner of the present invention. Finally, there is no movement of the charger spindles along the reference line until the two computed centers coincide at the same point of intersection of the common line with the arc path of travel of pivoted pendulum arms in the manner of the present invention.

The present invention has an advantage over the prior lathe chargers in that it enables the log block to be positioned more accurately so that the charger spindles engaging such log blocks may be closely spaced within a minimum nominal clearance of, for example, ⅛" of the chucks of the pendulum arms when they clamp the log prior to releasing the charger spindles for transferring the log from the charger to the veneer lathe spindles. This enables more reliable transfer of logs to the lathe without dropping the logs and without interference between the pendulum chucks and the charger spindles and/or lathe spindles.

SUMMARY OF THE INVENTION

It is therefore one object of the present invention to provide an improved method and apparatus for positioning logs in a lathe charger for transfer to a veneer lathe with greater accuracy for more efficient and higher veneer production.

Another object of the invention is to provide such an apparatus and method in which the logs are more accurately positioned so that the charger spindles have a minimum nominal clearance with respect to the chucks on the pendulum arms when they engage the opposite ends of the log after scanning to transfer the log from the lathe charger to the lathe spindles without dropping logs.

A further object of the present invention is to provide such a method and apparatus in which the geometrical centerline of the log is determined by sensing the log with mechanical sensors or light sensors or both and charger spindles are caused to engage geocenters at the opposite ends of the log formed by the intersection of such geometrical centerline with such log ends, the log is rotated about such charger spindles while scanning it with light to determine the optimum yield axis of the log by computer processing of the scan data and to locate the positions of computed centers of the opposite ends of the log where such yield axis intersects such log ends, a displacement angle is measured between a common line extending between such computed centers and a reference axis which can either be a vertical axis or the pendulum arm radius, then the log is rotated through such displacement angle to position the common line parallel to the reference axis, and thereafter moving the charger spindles engaging the geocenters of the logs along the reference axis until the computed centers of the log are both at the intersection of the common line and the arc of travel of the pendulum arms when they transfer the log from the charger spindles to the lathe spindles.

An additional object of the present invention is to provide such an apparatus and method for positioning logs in a lathe charger in which chucks on the pendulum arms engage the opposite ends of the log separated by a predetermined minimum clearance space from the charger spindles and the pendulum arms pivot to move the log so that the superimposed computed centers of the log are placed in alignment with the axis of the lathe spindles for more accurate peeling of logs of small and large diameter and higher veneer production.

BRIEF DESCRIPTION OF THE DRAWINGS

Other objects and advantages of the present invention will be apparent from the following detailed description of preferred embodiments thereof and from the attached drawings of which:

FIGS. 11–16 are diagrams of method steps used in a second method of the present invention for positioning logs with the lathe charger apparatus of FIGS. 9 and 10.

DETAILED DESCRIPTION OF PREFERRED EMBODIMENTS

Figure 1:
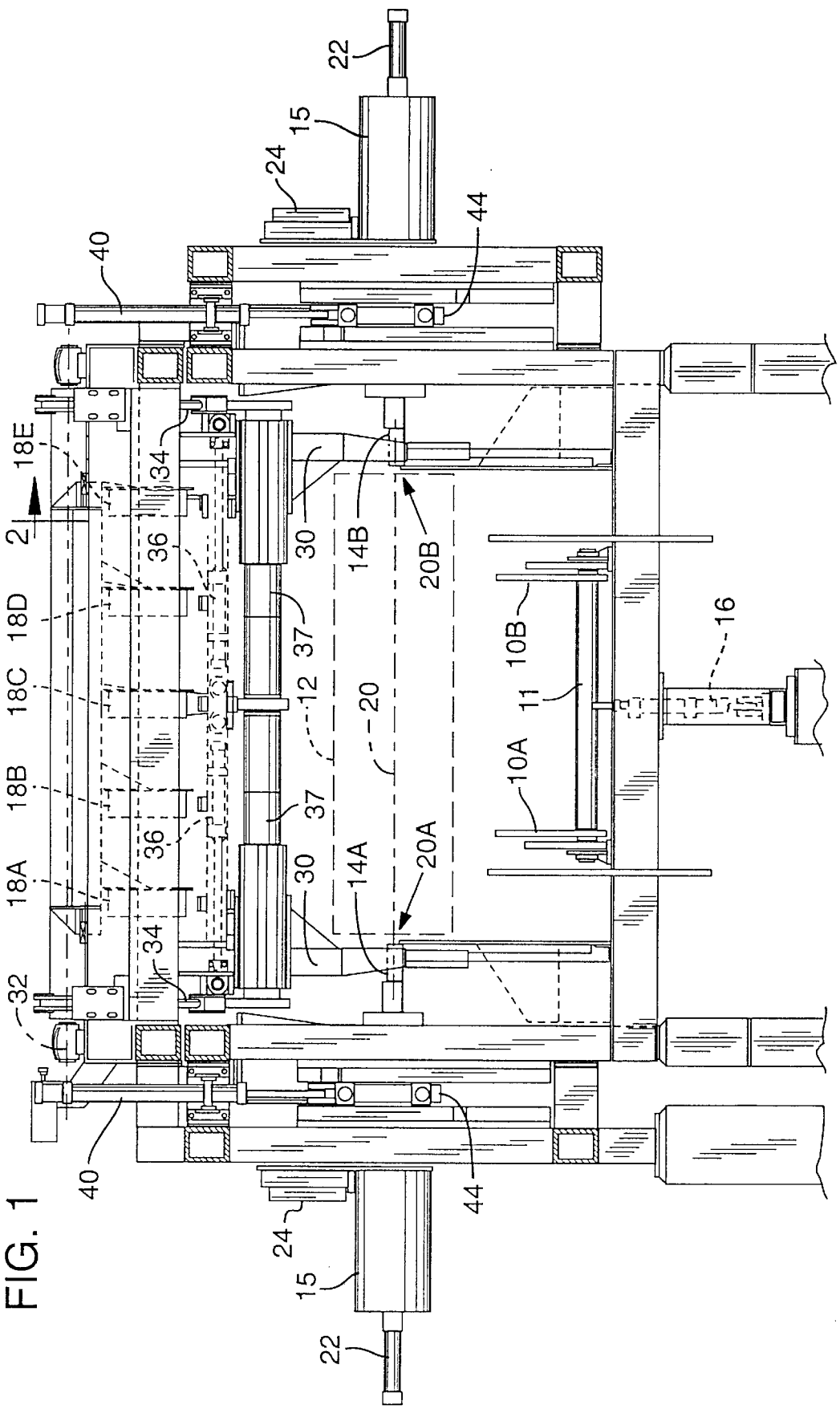
FIG. 1 is a front plan view of one embodiment of the lathe charger apparatus of the present invention.
Figure 2:
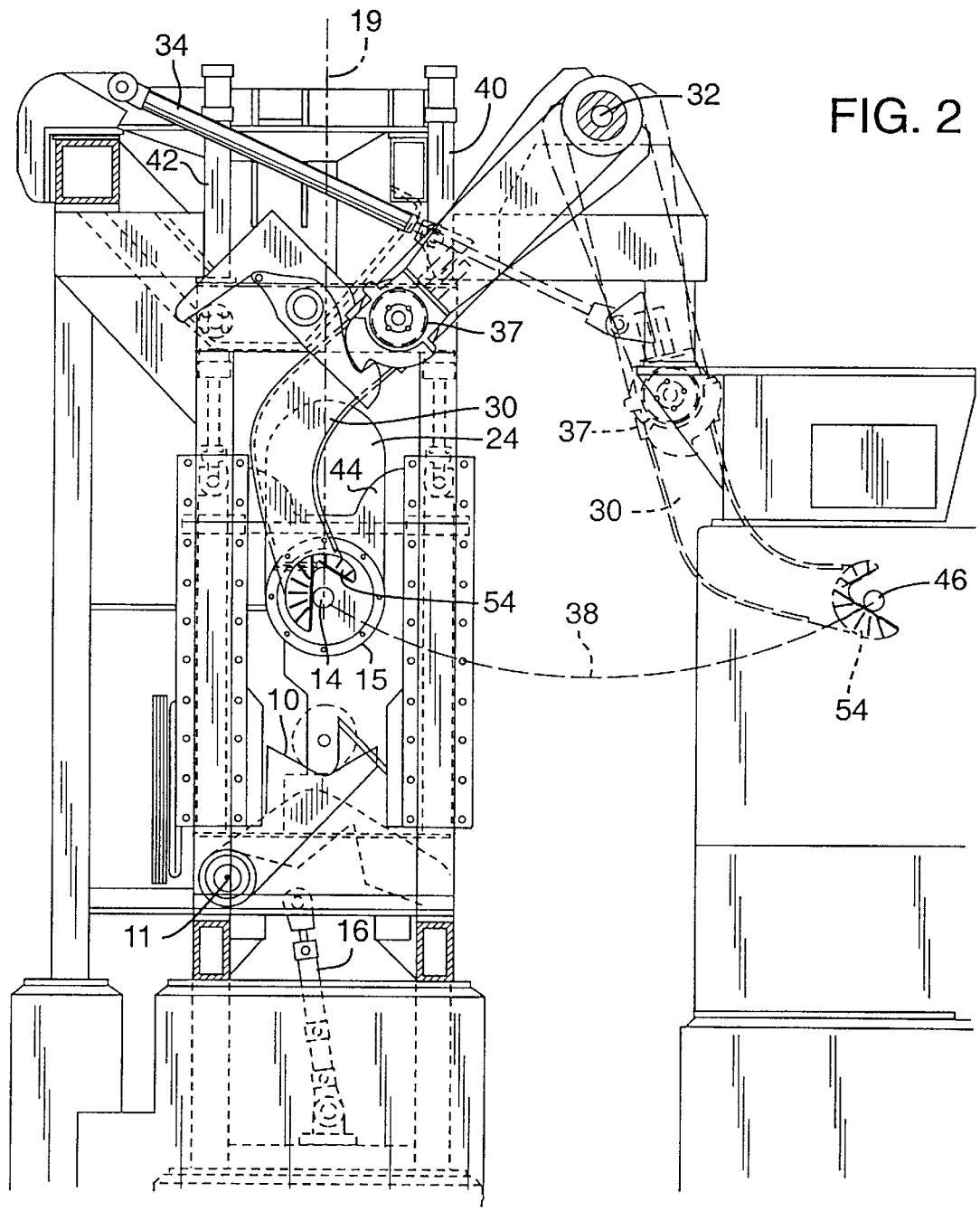
FIG. 2 is a side elevation view of FIG. 1.
Figure 3:
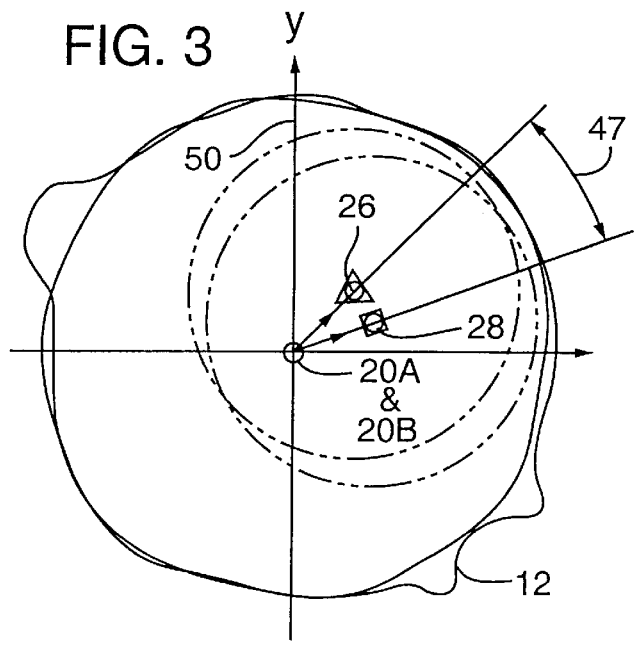
FIGS. 3–8 are diagrams of method steps used in a first method of the present invention for positioning logs with the lathe charger apparatus of FIGS. 1 and 2.

As shown in FIGS. 1 and 2, a lathe charger apparatus in accordance with one embodiment of the present invention includes two sets of support arms 10A and 10B spaced apart and mounted for pivoting about a shaft 11 at a position below a log block 12. The support arms support the log in a rest position as it is sensed by light sensors 18B and 18D as hereafter described, to determine its approximate centerline axis 20, hereafter referred to as its "geometrical centerline," in a manner similar to that described in U.S. Pat. No. 4,884,605 of G. Ely, issued Dec. 5, 1989. The log is moved upward on support arms 10A and 10B to the geometrical centerline position shown in FIG. 1 by a centering cylinder 16. A pair of charger spindles 14A and 14B are moved into engagement with the opposite ends of the log at geocenters 20A and 20B where the centerline 20 intersects the opposite ends of the log, as shown in FIG. 1. It should be noted that the geometrical centerline 20 of the log may be determined by mechanical sensing arms which engage the sides of the log to rough center the log as described in U.S. Pat. No. 4,335,763 of McGee, issued Jun. 22, 1982, or by a combination of mechanical sensing and light sensing.

Five light beam reflection scanners 18A, 18B, 18C, 18D, and 18E are supported above the log spaced longitudinally along the log so that five light beams are emitted therefrom along a scan axis 19 aligned with the charger spindles 14 as shown in FIG. 2. The light beams strike the log during scanning as the log is rotated by the charger spindles 14 and are reflected back to photocell detectors in such scanners which produce scan data signals that are transmitted to a computer for processing to determine the optimum yield axis of the log, as described in U.S. Pat. No. 4,884,605 of G. Ely, issued Dec. 5, 1989, which is hereby incorporated by reference. The term "log" as used herein refers to a log block of a predetermined length, such as 8 feet, with cut ends.

The log 12 is rotated about charger spindles 14 during scanning to determine the optimum yield axis of the log after such charger spindles are moved into engagement with the geocenters 20A and 20B of the log by actuating two cylinders 22 connected to the outside ends of spindle housings 15. The charger spindles 14 are rotated by one or more electric motors 24 connected thereto by gears. The optimum yield axis intersects the opposite ends of the log 12 at computed centers 26 and 28 as described and shown in the method steps of FIGS. 3–8 which show steps in a first method of log positioning using the apparatus of the first embodiment of the present invention shown in FIGS. 1 and 2.

A pair of pivoted pendulum arms 30 are mounted on the charger frame to extend adjacent the charger spindles 14 as shown in FIGS. 1 and 2 and to pivot about a pivot axis 32 in response to actuating cylinders 34. The pendulum arms are also moved longitudinally along the axis 32 by a pair of clamping cylinders 36 to cause the pendulum arms to move toward and away from each other along support beams 37. The lower ends of the pendulum arms are moved into engagement with the opposite ends of the log 12 for clamping the log between such arms to enable transfer of the log from the lathe charger to the veneer lathe. After the pendulum arms engage the ends of the log, the charger spindles 14 are retracted by cylinders 22 to release the log and the pendulum arms 30 are pivoted about the pivot axis 32 by cylinders 34 to move the log along an arcuate path 38 to the lathe spindles 46, as shown in FIG. 2. The charger spindles 14 are moved laterally by two pairs of electrically driven spindle positioners 40 and 42 which are connected to two spindle carriages 44 that are operated in the manner described in U.S. Pat. No. 4,884,605 of Ely issued Dec. 5, 1989.

As shown in FIG. 2, the two pendulum arms 30 are pivoted about pivot axis 32 by two pivoting cylinders 34 along the pendulum arc path 38 counterclockwise from the charger spindles 14 to a pair of lathe spindles 46. After the log is engaged by the lathe spindles 46, the pendulum arms 30 are unclamped and moved longitudinally along support beam 37 by cylinders 36 and then such pendulum arms are swung back clockwise to the charger spindles 14 by cylinders 34 to receive the next log.

A first method for positioning logs in accordance with the present invention using the lathe charger apparatus of FIGS.

1 and 2, is shown in the method steps of FIGS. 3–8. In the method step of FIG. 3, the vectors of the computed centers 26 and 28 where the optimum yield axis intersect the opposite ends of the log 12, are determined relative to the geometrical centerline 20 including the vector distance and vector angle by the computer from the scan data produced by scanners 18A–18E while the log is rotated about its geocenters 20A and 20B by charger spindles 14. In addition, an included angle 47 between the vectors of the computed centers 26 and 28 is determined by the computer. The included angle 47 is 25.0 degrees for the geocenters shown in the example of FIG. 3.

Figure 4:
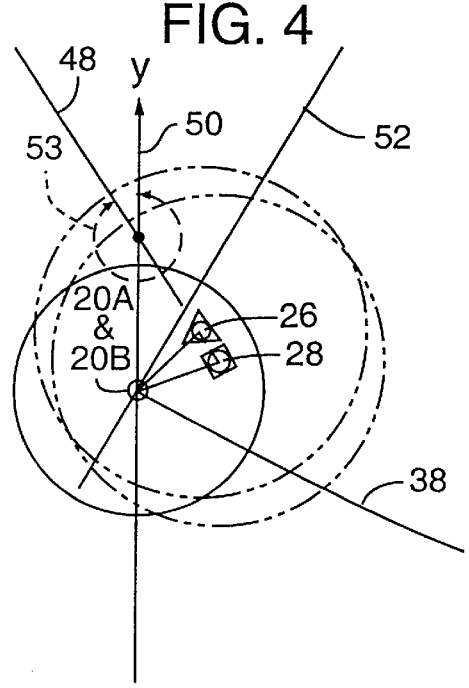

In the method step of FIG. 4, a common line 48 extending through the computed centers 26 and 28 is determined by the computer, such common line corresponding to the optimum yield axis of the log 12. A displacement angle 53 counterclockwise from the common line 48 to a reference line is measured. In this embodiment of the invention, a reference line 50 corresponding to the vertical axis Y is employed for displacement angle measurements because of a vertical face 51 which is provided on each chuck 54 of the pendulum arms 30. The computer determines the displacement angle 53 between the common line 48 and the reference line 50. In the example shown in FIG. 4, the displacement angle 53 is 327.5 degrees.

Figure 5:
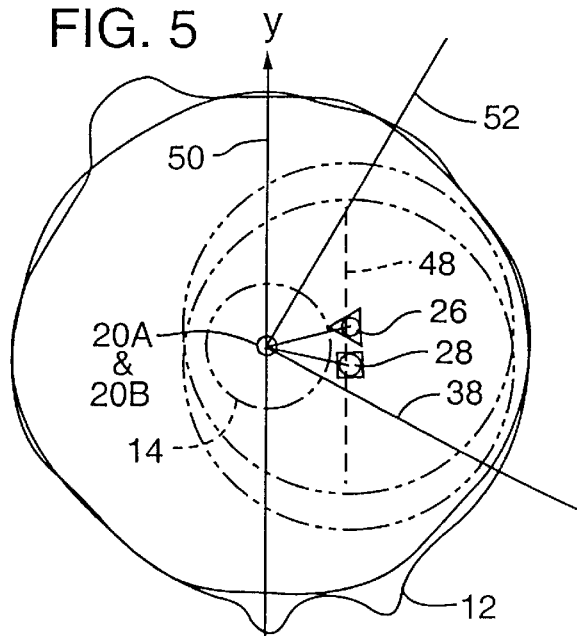

Next in the method step of FIG. 5, the log 12 is rotated counterclockwise on spindles 14 about the geocenters 20A and 20B through the displacement angle 53 from the position shown in FIG. 4, until the common line 48 is parallel to the reference axis 50 as shown in FIG. 5. Thus in FIG. 5, the common line 48 intersects the arc path 38 of travel of the pendulum arm 30 as it pivots about the pivot axis 32. The pendulum arm 30 extends along a radius line 52 from pivot axis 32 to the end of the arm centered on the geometrical centerline 20 at the geocenters 20A and 20B.

Figure 6:
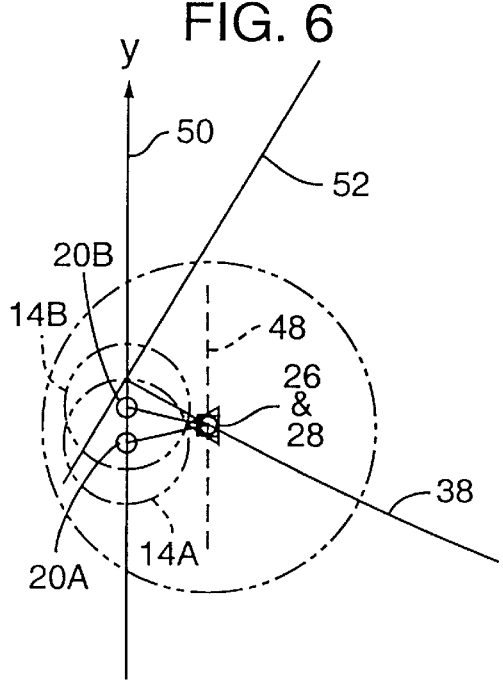

Then in the method step of FIG. 6, the charger spindles 14A and 14B are moved laterally along the reference axis 50 by actuating cylinders 40 and 42 moving the spindle carriages 44 until both computed centers 26 and 28 at the opposite ends of the log are positioned on the point of intersection of the common line 48 with the arc path 38 of the pendulum arms.

Figure 7:
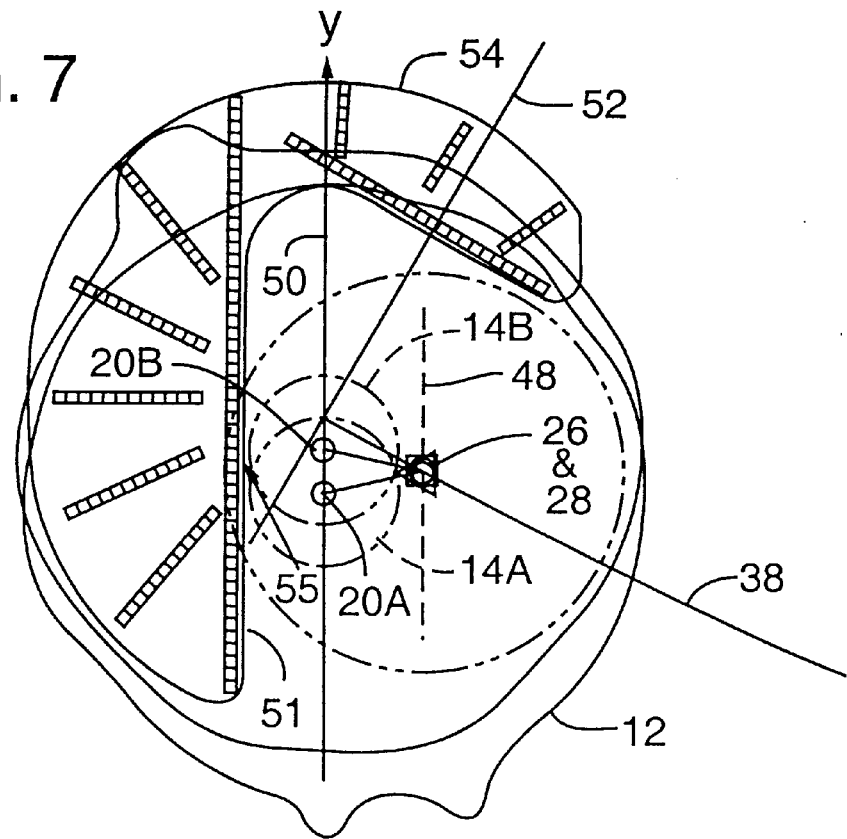
Figure 8:
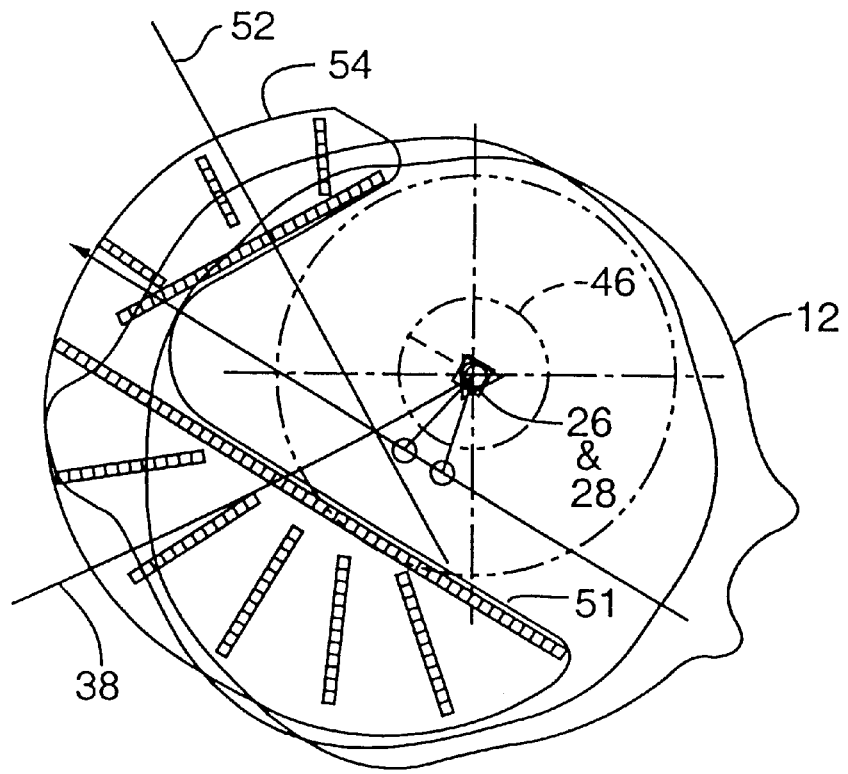

In the method step of FIG. 7, the pendulum arms 30 are moved inward by cylinders 36 until chucks 54 on such pendulum arms engage the log ends at a clamped position with the vertical face 51 of each chuck spaced from the charger spindles 14A and 14B by a predetermined minimum clearance space 55 of typically ⅛ inch. In this position, the log 12 is clamped between the chucks 54 for transfer to the lathe from the lathe charger. In FIG. 8, the log is pivoted counterclockwise along the arc path 38 by pivoting the pendulum arms 30 about axis 32 from the lathe charger to the veneer lathe where the computed centers 26 and 28 of the log are aligned with the axis of the lathe spindles 46. In the position of the log in FIG. 8, the lathe spindles 46 are extended to engage the log ends at the computed centers and the pendulum arm chucks 54 are disengaged from the log to enable the log to be rotated for veneer peeling. Then, the pendulum arms are pivoted clockwise back to the lathe charger at a position adjacent to the charger spindles where they can receive the next log.

Figure 9:
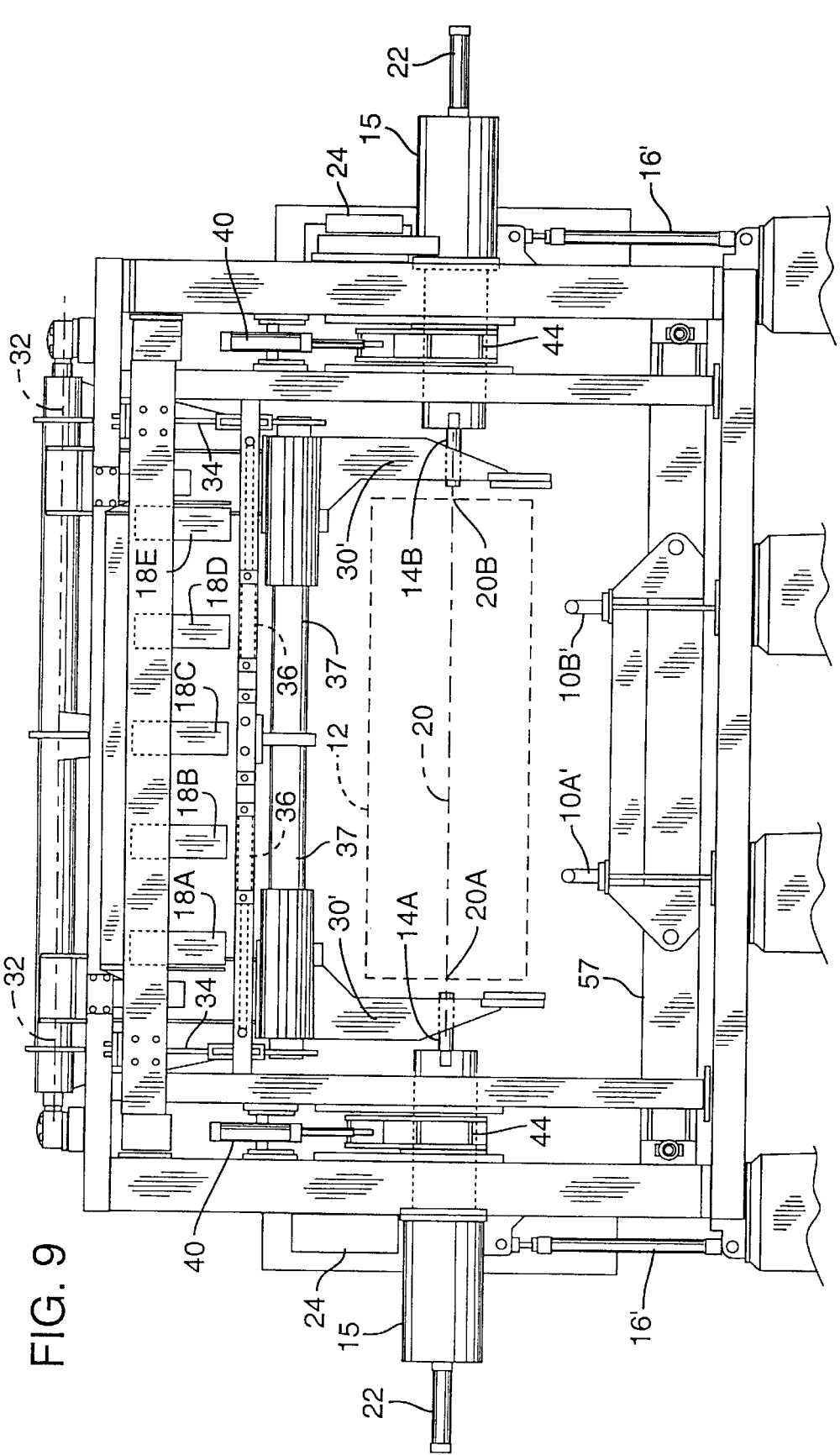
FIG. 9 is a front plan view of a second embodiment of the lathe charger apparatus of the present invention.
Figure 10:
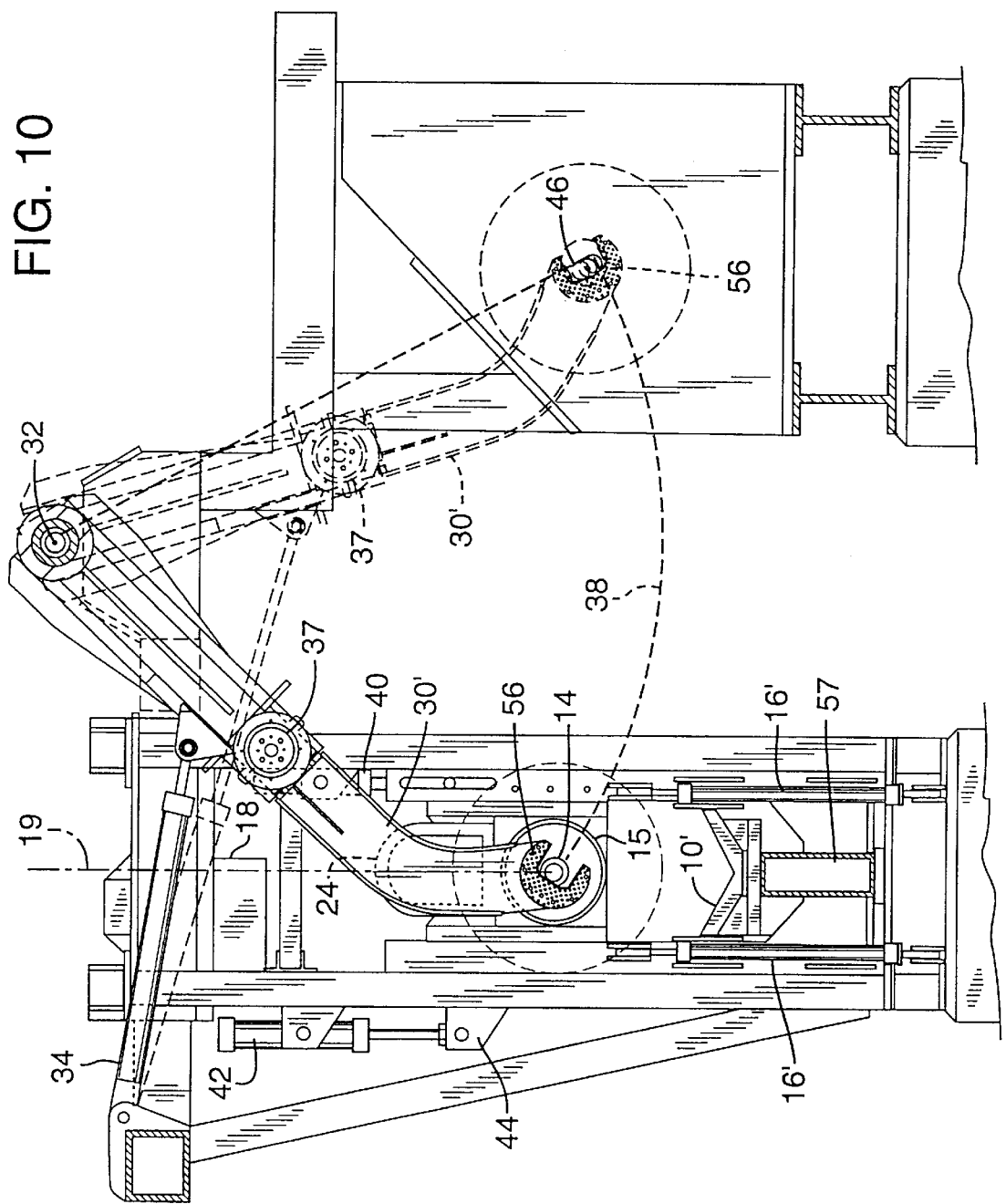
FIG. 10 is a side elevation view of FIG. 9.
Figure 11:
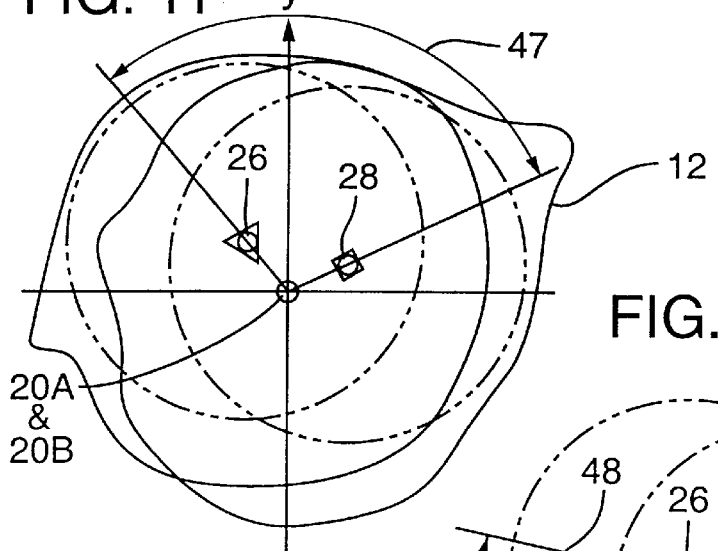

A second embodiment of the lathe charger apparatus of the present invention is shown in FIGS. 9 and 10 and is similar to the first embodiment of FIGS. 1 and 2 so that only the differences in the second embodiment will be described. A different geometric centering device including two spaced V-shaped support arms 10A' and 10B' mounted on a support beam 57 which is raised up by two pairs of centering cylinders 16', is employed. The log is sensed by light scanners 18B and 18D while such log is supported in an at-rest position and its geometrical centerline 20 is determined by the computer. Then the log is raised by the support arms and its geometrical centerline aligned with the charger spindles 14A and 14B. Also a different pendulum arm 30' with a U-shaped chuck 56 at its lower end is employed. The pendulum arms 30' clamp the ends of the log and transfer it along arcuate path 38 from the charger spindles 14 to the lathe spindles 46 as shown in FIG. 10.

A second method for positioning logs in accordance with the present invention using the lathe charger apparatus of FIGS. 9 and 10 is shown in the method steps of FIGS. 11–16. In the method step of FIG. 11, the log 12 has already been geometrically centered along geometrical centerline 20 with its geocenters 20A and 20B aligned with the axis of the charger spindles 14. The log has been scanned while rotating the log with such spindles to determine its optimum yield axis by computer processing of the scan data. The optimum yield axis intersects the opposite ends of the log 12 at computed centers 26 and 28. In the method step of FIG. 11, the vector distances and vector angles of the vectors of the computed centers 26 and 28 relative to the geocenters 20A and 20B, respectively, are determined by the computer as is the included angle 47 between the two vectors. In the example shown in FIG. 11, the included angle is 105.0 degrees.

Figure 12:
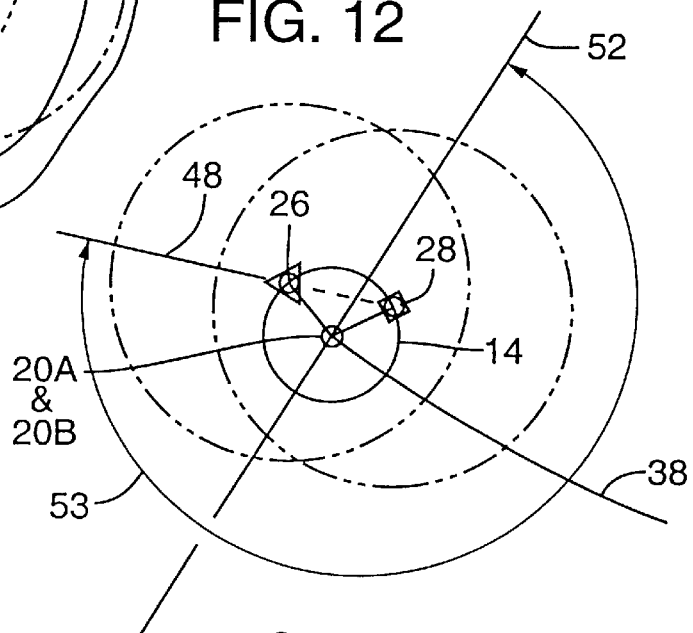

In the method step of FIG. 12, a common line 48 extending through the computed centers 26 and 28 and corresponding to the optimum yield axis is determined by the computer. Then the displacement angle 53 between such common line 48 and a reference line formed by the pendulum arm radius line 52 is determined by the computer. The pendulum arm radius 52 extends from the pivot axis 32 to the chuck 56 centered at geometrical centerline 20 of the geocenters 20A and 20B.

Figure 13:
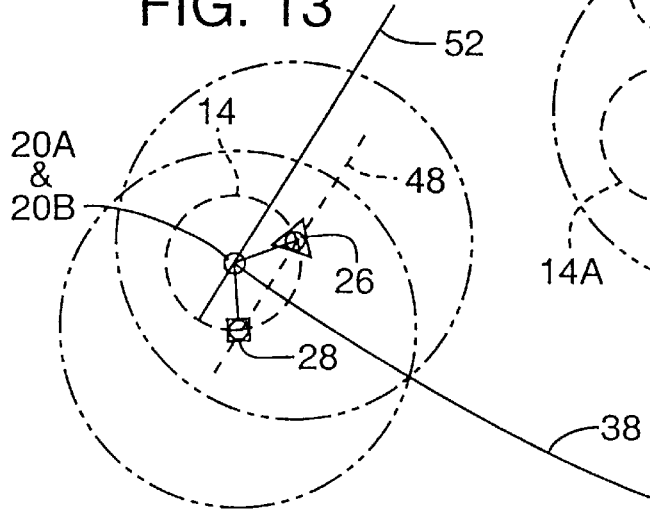

As shown in the step of FIG. 13, the common line 48 extending through the computed centers 26 and 28 is rotated counterclockwise through the displacement angle 53, which in the example shown as 250.22° to position the common line 48 parallel to the pendulum radius reference line 52.

Figure 14:
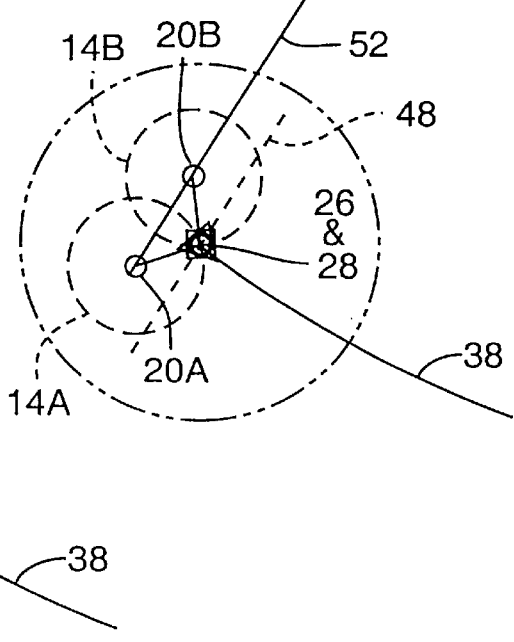

In the method step of FIG. 14, the charger spindles 14A and 14B are moved laterally along the pendulum radius reference line 52 until the computed centers 26 and 28 of the log both are positioned at the point of intersection of the common line 48 and the arc travel line 38 of the pendulum arm. Lateral movement of the charger spindles 14A and 14B is accomplished by actuation of the adjustment cylinders 40 and 42 as described above with regard to FIGS. 1 and 2.

Next in the step of FIG. 15, the pendulum arms 30' with U-shaped chucks 56 are moved along the support beam 37 by clamp cylinders 36 until the chucks 56 of the two pendulum arms engage the opposite ends of the log to clamp the log. Thus, as shown in FIG. 15, the charger spindles 14A and 14B are displaced laterally as are the geocenters 20A and 20B of the log because the computed centers 26 and 28 have both been positioned at the intersection of the common line 48 and the arc travel line 38. As a result, a back surface 58 of the U-shaped chuck 56 is spaced from the charger spindles 14A and 14B by a predetermined minimum clearance distance 55 of typically ⅛ inch to avoid interference between such spindles and the chuck. Then, the charger spindles 14 are disengaged from the log to allow it to be transferred from the charger to the lathe spindles 46.

In the step of FIG. 16, the pendulum arms 30 are rotated about the pivot axis 32 to move the chucks 56 and the log along the pendulum arm arc path 38 to the lathe spindles 46. In this position, the chucks 56 are unclamped from the log after the lathe spindles 46 engage the log. Then the lathe spindles 46 are rotated to cause the log to be peeled into a sheet of wood veneer by engagement with a lathe knife in a conventional manner.

It will be apparent to those having ordinary skill in the art that many changes may be made in the above-described preferred embodiments of the present invention without departing from the heart of the invention. For example, other types of scanners can be employed than light reflection scanners and other types of pendulum arms can be employed rather than pivoting arms. Therefore, the scope of the present invention should be determined by the following claims.

I claim:

1. Apparatus for positioning a log in a lathe charger for transfer to a veneer lathe, comprising:

a geometrical centering device for sensing the log and for centering the log to determine its geometrical centerline and two geocenters where the geometrical centerline intersects the opposite ends of the log;

charger spindles for engaging the two geocenters at the opposite ends of the log;

scanner device for scanning the log with electromagnetic radiation to produce scan data signals for determining an optimum yield axis of the log;

computer system for processing said scan data signals for computing said optimum yield axis and two computed centers at the opposite ends of the log where said optimum yield axis intersects said opposite ends, for determining a common line which extends between the two computed centers and corresponds to the optimum yield axis, and for determining a displacement angle between said common line and a reference line; and adjustment mechanism for rotating the log through the displacement angle so that the common line is parallel to the reference line, and moving the lathe charger spindles laterally to position the two computed centers at the intersection of the common line and a line of travel of pendulum arms which move the log from the charger spindles to lathe spindles.

2. Apparatus in accordance with claim 1 in which the reference line is a vertical axis.

3. Apparatus in accordance with claim 1 in which the reference line is a pendulum arm radius extending from a pivot axis of said pendulum arm to the axis of its associated charger spindles.

4. Apparatus in accordance with claim 1 in which the pendulum arms have chucks that are moved into engagement with the opposite ends of the log after the computed centers are moved to the intersection of the common line and the line of travel, and the pendulum arms are pivoted about their pivot axis to transfer the log from the charger spindles to lathe spindles which engage the computed centers of said log.

5. Apparatus in accordance with claim 1 in which the computer system computes the vector angle and vector distance of each computed center relative to the geometrical centerline.

6. Apparatus in accordance with claim 1 in which the log is rotated by the charger spindles during scanning.

7. Apparatus in accordance with claim 1 in which the adjustment mechanism rotates the log about the charger spindles at the geocenters of the log through the displacement angle until the common line is parallel to the reference line, and moves the charger spindles along the reference line to position the two computed centers at the intersection of the common line and the line of travel of the pendulum arms.

8. Apparatus in accordance with claim 1 in which the geometrical centering device includes light sensors for sensing the log in an at-rest position to determine its geometrical centerline.

9. A method for positioning a log in a lathe charger for transfer to a veneer lathe, comprising the steps of:

geometrically centering the log to determine its geometrical centerline and two geocenters where the centerline intersects the opposite ends of the log;

scanning the log with light for producing scan data signals to determine an optimum yield axis of the log;

processing the scan data signals by computer for determining the optimum yield axis and two computed centers where said optimum yield axis intersect the opposite ends of the log, for determining a common line which extends between the two computed centers and corresponds to the optimum yield axis, and for determining a displacement angle between said common line and a reference line;

rotating the log through the displacement angle to position the common line parallel to the reference line; and adjusting the charger spindles along the reference line to position the two computed centers at the opposite ends so that both of the computed centers are at the intersection of the common line and an arc line of travel of rotating pendulum arms which transfer the log from the charger to the veneer lathe.

10. A method in accordance with claim 9 in which the reference line is a vertical axis.

11. A method in accordance with claim 9 in which the reference line is a pendulum arm radius extending from the pivot axis of said pendulum arm to the axis of the changer spindle.

12. A method in accordance with claim 9 in which the log is transferred from the charger to the lathe by pivoting the pendulum arms about their pivot axis after chucks on said arms engage the ends of the log at a position adjacent the intersection of said computed centers and said arc line but spaced from the charger spindles by a clearance space.

13. A method in accordance with claim 9 in which the computer determines the vector angle and vector distance of each computed center relative to the geometrical centerline.

14. A method in accordance with claim 9 in which the log is rotated by the charger spindles during scanning by light beams to determine the optimum yield axis.

15. Apparatus for positioning a log in a lathe charger for transfer to a veneer lathe, comprising:

geometrical centering device for sensing the log to determine its geometrical centerline and two geocenters where the geometrical centerline intersects the two opposite ends of the log;

charger spindles for engaging the two geocenters at the opposite ends of the log;

scanner device for optically scanning the log to produce scan data signals for determining an optimum yield axis of the log;

computer system for processing said scan data signals for computing said optimum yield axis and two computed centers at the opposite ends of the log where said optimum yield axis intersects said opposite ends, for determining a common line which extends between the two computed centers and corresponds to the optimum yield axis, and for determining a displacement angle between said common line and a reference line; and adjustment mechanism for rotating the log through an adjustment angle corresponding to said displacement angle to reposition the common line parallel to the reference line, and moving the charger spindles to position the log so that the two computed centers are both located at the intersection of the common line and an arc line of travel of pivoting pendulum arms which move the log from the charger spindles to the lathe spindles.

16. Apparatus in accordance with claim 15 in which the scanner device scans the log with light beams while the log is rotating on the charger spindle.

17. Apparatus in accordance with claim 15 in which the reference line is a vertical axis.

18. Apparatus in accordance with claim 15 in which the reference line is a pendulum arm radius extending from a pivot axis of said pendulum arm and the axis of its associated charger spindle.

19. Apparatus in accordance with claim 15 in which the computer system computes the vector angle and vector distance of each computer center relative to the geometrical centerline.

20. Apparatus in accordance with claim 15 in which the pendulum arms have chucks that are moved into engagement with the opposite ends of the log after the computed centers are moved by the adjustment mechanism to the intersection of the common line and the arc line, and the pendulum arms are pivoted about their pivot axis to transfer the log from the charger spindles to lathe spindles with the computed centers in alignment with the axis of the lathe spindles.

* * * * *